US006722575B1

(12) United States Patent
Gagne et al.

(10) Patent No.: US 6,722,575 B1
(45) Date of Patent: Apr. 20, 2004

(54) TEMPERATURE SENSING ADAPTER AND AUTOMATIC TEMPERATURE REGULATING MIXING VALVE CONSTRUCTED THEREWITH (75) Inventors: Kelly S. Gagne, St. Charles, IL (US); Philip C. Hawken, Darien, IL (US); James E. Pearson, Downers Grove, IL (US)

(73) Assignee: Robertshaw Controls Company, Richmond, VA (US)

( * ) Notice: Subject to any disclaimer, the term of this patent is extended or adjusted under 35 U.S.C. 154(b) by 0 days.

(21) Appl. No.: 10/299,149

(22) Filed: Nov. 19, 2002

(51) Int. Cl.[7] ............................................... G05D 23/13
(52) U.S. Cl. ....................................... 236/12.12; 4/676
(58) Field of Search ................... 236/12.12; 374/148; 4/676, 677; 68/12.22

(56) References Cited

U.S. PATENT DOCUMENTS

| 3,207,435 | A | * | 9/1965 | Erickson et al. | ......... | 236/12.12 |
| 3,337,130 | A | * | 8/1967 | Erickson | ................. | 236/12.12 |
| 4,031,911 | A |   | 6/1977 | Frazar |   |   |
| 4,528,709 | A | * | 7/1985 | Getz et al. | ...................... | 8/158 |
| 4,774,978 | A | * | 10/1988 | Lepine et al. | ................ | 137/334 |
| 5,032,992 | A |   | 7/1991 | Bergmann |   |   |
| 5,400,961 | A | * | 3/1995 | Tsutsui et al. | ........... | 236/12.12 |
| 5,439,019 | A |   | 8/1995 | Quandt et al. |   |   |
| 5,577,660 | A |   | 11/1996 | Hansen |   |   |
| 5,873,518 | A |   | 2/1999 | Richmond et al. |   |   |
| 5,978,995 | A |   | 11/1999 | Bruntz et al. |   |   |
| 5,984,194 | A |   | 11/1999 | Francalanci |   |   |
| 6,003,182 | A |   | 12/1999 | Song |   |   |
| 6,056,201 | A |   | 5/2000 | Ta |   |   |
| 6,059,192 | A |   | 5/2000 | Zosimadis |   |   |
| 6,286,764 | B1 |   | 9/2001 | Garvey et al. |   |   |
| 6,305,610 | B1 |   | 10/2001 | Estes |   |   |
| 6,327,730 | B1 |   | 12/2001 | Corbett |   |   |
| 6,427,260 | B1 | * | 8/2002 | Osborne-Kirby | ............... | 4/678 |

FOREIGN PATENT DOCUMENTS

| EP | 89301210.4 | 10/1989 |
| EP | 89115904.8 | 9/1990 |
| JP | 03058817 | 8/1992 |

* cited by examiner

Primary Examiner—William E. Tapolcai
(74) Attorney, Agent, or Firm—Leydig, Voit & Mayer, Ltd.

(57) ABSTRACT

An adapter for use with a mixing valve, an automatic temperature regulating mixing valve, and a method of providing automatic temperature regulation for a fluid mixing valve are provided. The adapter includes an inlet adapted to attach to an outlet of a mixing valve, and at least one temperature sensing switch positioned to sense the temperature of fluid flowing through the adapter. The thermal sensing switch activates at a predetermined temperature to close its internal contacts. This contacts are wired between the line inputs of the electrically controlled valves governing the flow of fluid into each of the hot and cold fluid inlets of the mixing valve. Both or either a high and low temperature switch may be used. The adapter may also include a flow control element.

38 Claims, 9 Drawing Sheets

TEMPERATURE SENSING ADAPTER AND AUTOMATIC TEMPERATURE REGULATING MIXING VALVE CONSTRUCTED THEREWITH

FIELD OF THE INVENTION

The present invention is directed to water temperature regulation, and in particular to controllable mixing valves and associated control for water temperature regulation for appliance usage.

BACKGROUND OF THE INVENTION

In the consumer and commercial appliance industry, and with particular applicability to clothes washing machines, water temperature regulation is accomplished primarily through the timed mixing of hot and cold water inputs. The hot water input is typically provided from a consumer or commercial hot water heater which supplies hot water for various uses throughout the home or establishment. Depending on its other utilizations, the hot water is typically provided at a temperature of approximately 140° Fahrenheit, although this temperature may be set by the user. The cold water input is typically provided at the tap from the cold water input into the home or establishment. While this cold water input is not typically temperature adjustable, common cold water inputs are approximately 60° F. However, this temperature may vary depending upon location, installation, utility supply, etc.

While the hot and cold water are typically supplied at the above-described temperatures, seldom is the use for water at these particular temperatures. That is, most usages of the water require mixing of the hot and cold water inputs to accommodate a particular usage. For example, commercial and consumer clothes washers provide different washing cycles with user selectable water temperatures from hot, to warm, to cold. However, water at 140° F. may damage some fabrics. Further, stringent consumer energy standards for these appliances limit the amount of hot water that may be used therein. Further, while cold water detergents are available and are in wide usage, particular for brightly colored fabrics, these detergents do not perform particularly well as the water temperature drops below, for example, 70° F. As such, even clothes washing machines that provide hot and cold washing cycles do not typically utilize only water from either the hot or the cold input directly.

In such clothes washing machines, electronically controlled temperature mixing valves are typically employed to provide a combination flow of hot and cold water inputs to the washing drum. The control of the individual hot and cold water inputs to the mixing valve traditionally has been provided by an electromechanical timer circuit, although more modern controllers may replace the electromechanical timer function with an electronic timer control circuit. In either event, the operation of these two timing mechanisms is effectively the same from the mixing valve standpoint. As an example, the timer circuit may operate to provide a one-minute fill time of the washing tub. During that one-minute fill time, the timer may energize the electrically controlled valve for the hot water input to allow a flow of the hot water into the washing tub from the beginning of the fill cycle. The timer circuit may then energize the cold water input control valve after, for example, approximately 30 seconds of the fill cycle. In this way, the temperature of the water in the washing tub is reduced below that which would result if only the hot water valve were used. Different operating fill timing schemes are typically employed by the timer circuits to control the time during which each of the hot and cold water inputs are energized to provide the various water temperature cycles allowed by the washing machine.

While the timer control of both the hot and cold water inputs to the mixing valve operates satisfactorily for a majority of applications, various factors may exist in particular installations that do not provide satisfactory results for that particular installation. These problems relate to a breakdown of the primary assumption under which a timer controller may be utilized for temperature control of the water in the washing tub. Specifically, the timer relationships of a period of time for which each of the hot and cold water inputs allow the flow of their respective temperature water is based upon a generalized assumption of what the hot water temperatures and cold water temperatures are. However, in installations where the washing machine is remotely located from the hot water heater, for example, the temperature of the hot water input may initially be quite a bit lower than the typically assumed temperature of the hot water input.

As such, allowing the hot water valve to be opened for only a pre-selected period of time before the cold water valve is opened may result in a washing tub water temperature significantly below that which is desired and which would have resulted had the hot water input to the mixing valve been at its assumed temperature. In other words, if the temperature of the hot water input is only 120° F. for the first 30 seconds of the fill cycle as controlled by the timer, opening the cold water input and closing the hot water input for the second half of the fill cycle will result in the water temperature of the washing tub being cool instead of warm as would have been the case if the hot water input were actually at its assumed 140° F. temperature during the first 30 seconds of the exemplary one minute fill cycle.

Similarly, the temperature of the cold water input is likely to be higher than the steady state water input from the utility during the initial period of water flow, until the water in the pipe between the utility input and the washing machine is used up. This results from the ambient heating of the pipe and water when no water is flowing. As such, utilizing timed fill cycle control may well result in the washtub water temperature being much warmer than desired for a cold water wash where the hot water control valve is turned on for some timed period during the fill cycle time. Each of these problems is exacerbated by physical location of the washing machine in each particular location in relation to the utility cold water input and the location of the hot water heater, as well as the user temperature setting of the hot water heater itself.

Recognizing the problem that reliance on assumed water temperatures with a timer circuit presented, systems were developed to operate in conjunction with the water valve timer control to add an element of temperature sensing. One such system is described in U.S. Pat. No. 5,984,194 to Francalanci, entitled "Valve for Controlling the Temperature of the Water in a Washing Machine or Dishwasher, Methods of Treating Water in These Machines Which Can be Implemented by Means of Said Valve and Machines for Washing Using This Valve." In such systems, a specialty mixing valve is required that includes a thermostat placed in proximity to a thinned portion of an exterior wall of the valve to sense the water temperature therein. When the temperature of the water flowing through the valve increases above or drops below the set point of the thermostat, an internal switch closes or opens. In the system of the '194 patent, this thermostat is used in line with the timer control circuit to hold off the timed closure of the cold water solenoid until the hot water flowing through the valve increases to its assumed or expected temperature. Specifically, the system of the '194 patent prevents the timer control circuit from opening the cold water valve until and unless the hot water has reached the temperature set point of the switch. Indeed, for the one minute fill cycle example discussed above where the cold water solenoid is energized 30 seconds into the fill cycle, if the hot water never reaches the temperature set point of the thermostat, the cold water valve will be prevented from turning on during its 30 second timed cycle.

Unfortunately, while such systems address the problem of cool water in the hot water pipe during the initial period of a fill cycle, their operation is still fundamentally governed by the timer control circuit. As these systems cannot adjust for temperature excursions on the outside of the normally anticipated temperature limits. Therefore, such systems are not acceptable in view of the tighter energy usage requirements and in view of the potential damage to delicate fabrics. Specifically, systems such as that described in the '194 patent cannot use temperature to directly control the turning on or off of either of the water valves. This control resides exclusively with the timer control circuit.

As such, if a user were to purposefully or inadvertently set the water heater temperature to an extremely high temperature, the system of the '194 patent would allow this extremely high temperature water to flow into the wash tub for the full time period set by the timer control circuit. However, even though the thermostat of the '194 patent would sense this very high temperature and close its electrical contact, the timer would continue to allow only the hot water to flow into the wash tub until the timed cycle for cold water flow had arrived. The result would be a washtub water temperature which is too high. Such a high temperature in the washtub may damage delicate fabrics, such as silk, and will exceed the energy utilization requirements for the appliance. Similarly, if the cold water input is much colder than expected, the hot water control valve still would not be turned on until the timer times out its predetermined period of time.

In other words, in systems such as that described in the '194 patent, the wash tub water temperature is still a function of timed opening and closing of the hot and cold water temperature valves, regardless of the actual sensed temperatures. Therefore, these timed water temperature mixing periods cannot guarantee appropriate washtub water temperatures. As a result, delicate fabrics may be damaged due to over-temperatures, excessive energy may be wasted, and clothes may not be cleaned due to under-temperatures.

Another drawback of such systems is the requirement for the specialty mixing valve that includes the temperature elements integrated therein. The cost of these valves is much greater than the typical mixing valves, thus driving up the cost of the appliance. Further, since most manufactures produce both simple and more sophisticated appliances in their lines, the manufacture would have to either stock two different types of mixing valves, or use the more expensive specialty valve in the simpler models even though the temperature sensing functionality is not used. In the highly cost competitive consumer appliance industry, such additional costs cannot be justified.

There exists, therefore, a need in the art for a water temperature control system that allows for temperature corrected mixing hot and cold water inputs.

BRIEF SUMMARY OF THE INVENTION

In view of the above, the invention provides a new and improved hot and cold water mixing valve that overcomes these and other problems existing in the appliance art. More specifically, the present invention provides a new and improved adapter that may be used with a conventional hot and cold water mixing valve. The adapter includes hot and/or cold temperature sensing and control circuits that automatically control the temperature of the water flowing through the valve. This control circuit operates directly to control the opening and closing of an opposite temperature control valve to minimize the water temperature excursion beyond the set point of the temperature sensing elements of the improved valve of the present invention.

In one embodiment, the invention is a device that is attached to a hot and cold water mixing valve for use in the laundry industry. A thermal acting switch is insert molded or placed into a pocket of an outlet for hose connections that are attached to the water valve by various methods. As water flows through the valve, the thermal switch senses the water temperature and closes at its predetermined temperature. A control circuit is included such that actuation of the switch provides voltage to operate the electric coil of a valve operator controlling the input of water of an opposite temperature. This valve operator then allows water of an opposite temperature to flow and mix with the initial water and change the temperature of the outlet water. Depending of the type of thermal acting switch provided, the present invention can be used to lower the output water temperature or raise the output water temperature or both. The outlet is constructed to hold a high temperature limit switch, a cold temperature limit switch, or both at the same time. The speed at which the thermal acting device activates can be sensitized or desensitized in the present invention by controlling the thickness of the wall between the switch and the water flow, by selecting specific properties of the material, or by the switch set points themselves. The outlet flow may also be controlled in one embodiment of the present invention through the provision of a flow control element therein.

Preferably, an embodiment of the invention utilizes thermal switches to control upper and/or lower temperature limits in a manner that requires no additional electronics external to the valve itself. That is, the valve of the present invention provides a self-contained high temperature limit on the water valve itself and/or self-contained low temperature limit on the water valve. As such, the more stringent energy standards becoming effective in 2004 and 2007 may be met by minimizing usage of hot water during wash cycles. Further, the washability of clothes during cold water washes is also improved by controlling the minimum water temperature during such washes. In an embodiment utilizing a spin-on or screw-on inlet, an optional flow control may be provided to provide maximum flow and temperature control fully contained within the valve of the present invention. Alternatively, such flow control may be provided by proper sizing of fixed orifices in the valve adapter body. However, embodiments of the present invention that utilize an optional flow control in the inlet allow for rapid accommodation of customer requested changes in the flow rate by simply replacing the flow control element.

In one embodiment of the present invention, the high temperature thermal switch is wired in series with the cold water inlet solenoid control coil. In this way, when the high temperature switch senses that the water temperature is above the set point temperature of the switch, the switch closes. This activates the cold water input valve control solenoid to allow the flow of cold water into the mixing valve. When the sensed output temperature of the water drops below the temperature at which the high temperature thermal switch resets, electric power to the cold water solenoid control valve is shut off, which closes the cold water input to the mixing valve. This process continues until the desired amount of water in the wash tub is reached.

The low temperature thermal switch is wired in series with the hot water input valve control solenoid such that when the switch senses that the water temperature is below the set point of the thermal switch, the switch closes, activating the hot water input solenoid control valve. This allows the flow of hot water into the mixing valve to raise the temperature of the water flowing through the outlet. Once the sensed temperature of this outlet water rises above the reset temperature of the low temperature thermal switch, the switch opens, thereby deactivating the hot water valve control solenoid to stop the flow of hot water into the temperature mixing valve. Depending on the application, embodiments of the valves of the present invention may include either or both of the temperature sensing switches. Indeed, embodiments of the present invention provide different orientations of these thermal switches, both in-line and perpendicular to the outlet water flow.

In one embodiment of the present invention, an adapter is provided for use with a mixing valve having hot and cold fluid inlets, a mixing body, and an outlet, the mixing valve further having electrically controlled valves governing the flow of fluid into each of the hot and cold fluid inlets. The adapter comprises a flow body having an adapter inlet adapted to be attached to the outlet of the mixing valve, an adapter outlet, and a flow channel. Preferably, the flow body also forms at least one sensor pocket having an interior temperature sensing surface positioned in thermal communication with the flow channel. The adapter also includes a thermal sensing switch positioned in the sensor pocket to sense a temperature of the interior temperature sensing surface. In one embodiment, the sensor pocket is positioned along a length of the flow channel. Alternatively, the flow body defining a sensing chamber adjacent the adapter inlet, and the sensor pocket is positioned perpendicular to a length of the flow channel. In this embodiment, the interior temperature sensing surface is positioned in thermal communication with the sensing chamber. Preferably, the adapter inlet is further adapted to receive a flow control element. In this embodiment, the adapter further includes a flow control element positioned in the adapter inlet.

In one embodiment, the thermal sensing switch is a normally open switch that closes upon sensing a temperature greater than a predetermined threshold. Each electrically controlled valve of the mixing valve includes a solenoid control coil having a line and a neutral terminal, and each side of the normally open switch is electrically coupled to the line terminal of each of the solenoid control coils. Alternatively, the thermal sensing switch is a normally open switch that closes upon sensing a temperature less than a predetermined threshold. In this embodiment each side of the normally open switch is electrically coupled to the line terminal of each of the solenoid control coils. Preferably, the thermal sensing switch is removably positioned in the sensor pocket. Alternatively, the thermal sensing switch is insert molded into the sensor pocket.

In an embodiment, the flow body further comprises a second sensor pocket having an interior temperature sensing surface positioned in thermal communication with the flow channel, and a second thermal sensing switch positioned in the second sensor pocket to sense a temperature of the interior temperature sensing surface of the second sensor pocket. In this embodiment when each electrically controlled valve of the mixing valve includes a solenoid control coil having a line and a neutral terminal, each thermal sensing switch is electrically coupled between the line terminals of each of the solenoid control coils. In any embodiment, a thickness of the flow body between the interior temperature sensing surface and the flow channel is selected to provide a predetermined thermal transfer rate. Also, a material property of the flow body between the interior temperature sensing surface and the flow channel is selected to provide a predetermined thermal transfer rate. In one embodiment the flow body is molded plastic.

In a further embodiment of the present invention, an automatic temperature regulating mixing valve is provided. Such an automatic temperature regulating mixing valve comprises a mixing valve body having hot and cold fluid inlets, and an outlet. The mixing valve body further has electrically controlled valves governing the flow of fluid into each of the hot and cold fluid inlets. Each of these electrically controlled valves has a line input. The automatic temperature regulating mixing valve also includes an adapter having a flow body including an adapter inlet attached to the outlet of the mixing valve, an adapter outlet, and a flow channel. The flow body forms at least one sensor pocket having an interior temperature sensing surface positioned in thermal communication with the flow channel. The automatic temperature regulating mixing valve also includes a thermal sensing switch positioned in the sensor pocket to sense a temperature of the interior temperature sensing surface. The thermal sensing switch is electrically coupled between the line inputs of each of the electrically controlled valves. Preferably, the flow body further comprises a second sensor pocket having an interior temperature sensing surface positioned in thermal communication with the flow channel, and a second thermal sensing switch positioned in the second sensor pocket to sense a temperature of the interior temperature sensing surface of the second sensor pocket.

A further embodiment of the present invention provides a method of providing automatic temperature regulation for a fluid mixing valve having hot and cold fluid inlets, a mixing body, and an outlet, the mixing valve further having electrically controlled valves governing the flow of fluid into each of the hot and cold fluid inlets. This method comprises the step of providing a flow body having an adapter inlet, an adapter outlet, and a flow channel, the flow body forming at least one sensor pocket having an interior temperature sensing surface positioned in thermal communication with the flow channel. The method also includes the steps of placing a thermal sensing switch in the sensor pocket to sense a temperature of the interior temperature sensing surface, attaching the adapter inlet to the outlet of the mixing valve, and electrically coupling the thermal sensing switch between a line input of each of the electrically controlled valves.

Preferably, the step of attaching the adapter inlet to the outlet of the mixing valve comprises the step of spin welding the adapter inlet to the outlet of the mixing valve. Additionally, the step of placing a thermal sensing switch in the at least one sensor pocket may comprise the step of removably placing a thermal sensing switch in the at least one sensor pocket. Alternatively, the step of placing a thermal sensing switch in the at least one sensor pocket comprises the step of insert molding a thermal sensing switch in the at least one sensor pocket. In one embodiment, the method further comprises the step of controlling a thermal response rate of the thermal sensing switch. Preferably, the step of controlling a thermal response rate of the thermal sensing switch comprises the step of controlling a thickness of the flow body between the interior temperature sensing surface and the flow channel. Further, the step of controlling a thermal response rate of the thermal sensing switch may comprise the step of selecting a material property of the flow body between the interior temperature sensing surface and the flow channel. Further, the step of controlling a thermal response rate of the thermal sensing switch may comprise the step of selecting alternate upper and/or lower switch limit settings. Still further, the step of controlling a thermal response rate of the thermal sensing switch may comprise the step of selecting alternate switch differentials, which is the number of degrees between opening and closing of the switch.

In one embodiment the step of providing a flow body comprises the step of providing a flow body forming two sensor pockets. Further, the step of placing a thermal sensing switch in the sensor pocket comprises the step of placing a thermal sensing switch in each of the two sensor pockets. In such an embodiment, the step of electrically coupling the thermal sensing switch between a line input of each of the electrically controlled valves comprises the steps of electrically coupling each of the thermal sensing switches between the line input of each of the electrically controlled valves.

Other objects, advantages, and embodiments of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention, and together with the description serve to explain the principals of the invention. In the drawings.

While the invention will be described in connection with certain preferred embodiments, there is no intent to limit it to those embodiments. On the contrary, the intent is to cover all alternatives, modifications, and equivalents as included within the spirit and scope of the invention as defined by the appended claims.

DETAILED DESCRIPTION OF THE INVENTION

As discussed above, water temperature mixing valves have long been used in the laundry industry to control the flow of hot and cold water inputs in a washing machine. Indeed, the design of such a mixing valve is simple and cost effective. As discussed above, the control of the conventional water temperature mixing valve is accomplished through the utilization of a timer circuit that controls the period of time during which each of the respective water temperature input control solenoids is activated. This is done to roughly control the ultimate water temperature in the washing tub of the machine.

However, to provide a more sophisticated temperature sense feedback control of the water temperature flowing through the mixing valve, prior systems required the manufacture of a different, specialty water temperature mixing valve that included temperature sense circuitry integrated therein. This resulted in a greatly increased cost for the water temperature mixing valve, and the requirement that both temperature sensing and non-temperature sensing mixing valves be manufactured and stocked if a full line of washing machines were to be offered. Further, the cost of ownership of a washing machine utilizing the more sophisticated temperature feedback control increased because the entire temperature sensing mixing valve would have to be replaced if the temperature sensor portion were to fail.

Figure 1:
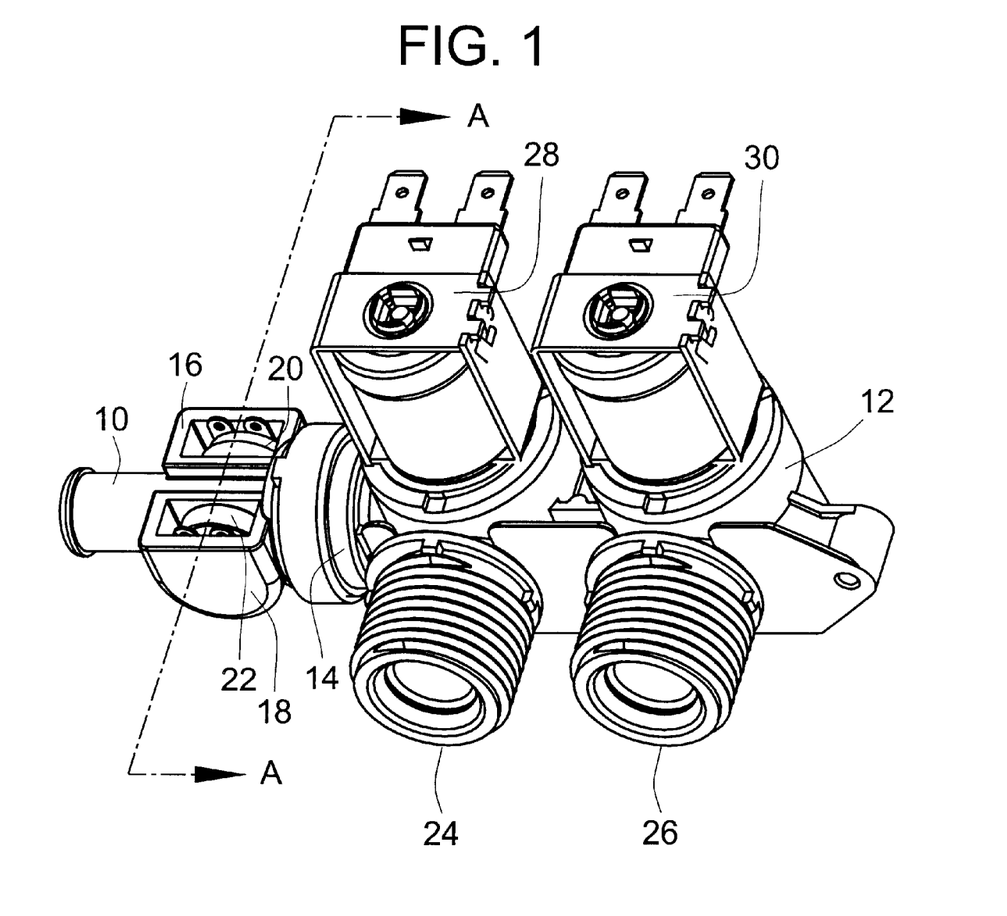
FIG. 1 is an isometric illustration of an automatic temperature regulating mixing valve constructed in accordance with the teachings of the present invention.

An embodiment of the present invention, however, provides a water temperature sensing adaptor 10 adapted to be utilized with a conventional water temperature mixing valve 12 to provide the more sophisticated temperature control of the water flowing into the washing tub without requiring that a totally separate mixing valve be designed and carried in inventory for such more sophisticated applications. As illustrated in FIG. 1 in assembled form, the water temperature sensing adaptor 10 is attached to the outlet 14 of the conventional mixing valve 12. This attachment may be made by various methods, and may provide permanent or removable attachment thereto. As an example of a permanent attachment method, the adaptor 10 may be spin-welded onto the outlet 14 of the mixing valve 12. As an example of a removable attachment, the adaptor 10 may simply be threaded onto the outlet 14 in a conventional manner. Of course, other know methods may be used.

In accordance with one embodiment of the present invention, the water temperature sensing adaptor 10 of the present invention includes two pockets 16, 18 into which may be placed a thermal acting switch 20, 22. These thermal acting switches 20, 22 may be retained in the pockets 16, 18 by various methods that allow for either removable or permanent placement therein. In typical laundry applications, the thermal switches 20, 22 will be selected to provide a maximum temperature set point and a minimum temperature set point above and below which the water temperature is not desired.

The speed at which the thermal acting switches 20, 22 responds to the water temperature flowing through the adaptor 10 may be sensitized or desensitized by the thickness of the adaptor material between the thermal acting switch and the water flow, the specific heat transfer properties of the material from which the adaptor 10 is made, or the switch set points themselves. The thinner the material between the thermal acting switch and the water flow and/or the better thermal transfer characteristics of the material, the faster the thermal acting switches 20, 22 may respond to a change in water temperature flowing through the adaptor 10. To the contrary, the thicker the material between the thermal acting switches 20, 22 and the water flow or the poorer the thermal transfer characteristics of the material itself, the slower the thermal acting switches 20, 22 will respond to a change in water temperature flowing through the adaptor 10. In a preferred embodiment, the adaptor 10 is made of plastic.

As is well-known, the conventional water temperature mixing valve 12 includes a hot and a cold water inlet 24, 26. The flow of water through these inlets 24, 26 is controlled by solenoid control valves 28, 30. Once the appropriate valve control solenoid has been actuated, water is allowed to flow from the inlet into the body of the mixing valve 12 and through the outlet 14. If both of the valve control solenoids are activated, water of opposite temperatures is allowed to flow through each of their respective inlets 24, 26 into the body of mixing valve 12 wherein they are combined into a single outlet flow through valve outlet 14. The temperature of the water flowing through outlet 14 in such a situation is determined by the individual temperatures of each of the hot and cold water flowing into the body of the mixing valve 12.

Figure 2:
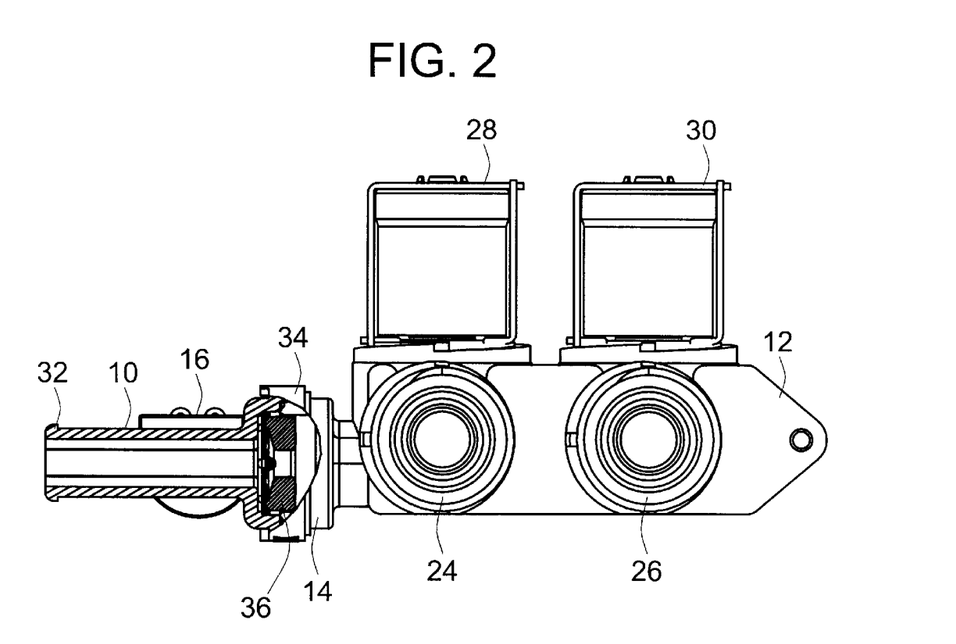
FIG. 2 is a partial cutaway illustration of the embodiment of the present invention illustrated in FIG. 1.

As may be seen from the partial cutaway of FIG. 2, the water temperature sensing adaptor 10 in this embodiment includes an outlet 32 that may be adapted to receive the washtub fill hose in applications that utilize such a hose. The adaptor 10 of the present invention also includes an input connector 34 that is adapted to receive the outlet 14 of the conventional water temperature mixing valve 12 as discussed above. Recognizing that different applications require a different flow rate, the adaptor of the present invention provides an additional advantage in that it may also include a water flow regulating device 36. This flow regulating device 36 may be selected for the particular customer application, and may easily be changed to accommodate changing flow rate requirements for different applications. As such, a single mixing valve 12 may be provided to supply multiple applications having differing temperature control sophistications and flow rates. In an alternate embodiment of the present invention, the flow rate through the adaptor 10 may be controlled through the size of the fixed orifice through the adaptor 10. In either embodiment, tighter control on the water flow provides tighter control and predictability of water temperature in the washing tub.

Figure 3:
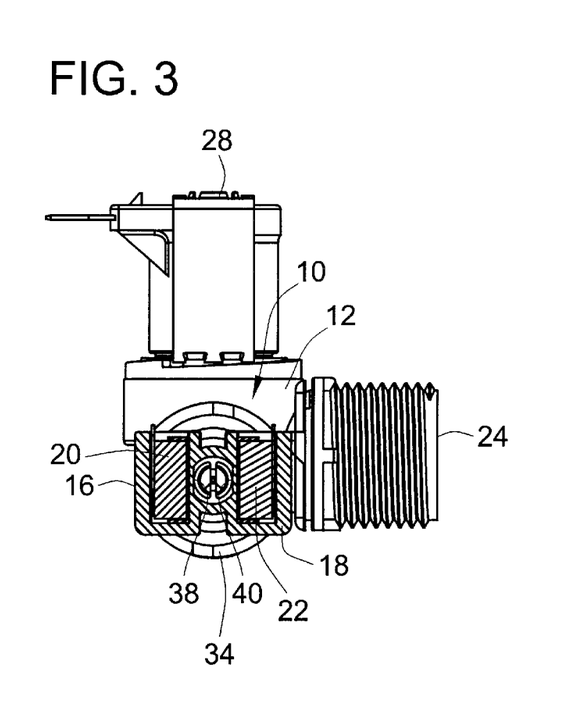
FIG. 3 is an end view cross-sectional illustration taken along Section AA of the embodiment of the present invention illustrated in FIG. 1.

As may be seen from the end cross-sectional view of FIG. 3, the thickness of the walls 38, 40 adjacent each of the thermal acting switches 20, 22 and the flow channel is controlled to provide a desired response time for changes of water temperature flowing through the adaptor 10.

Figure 4:
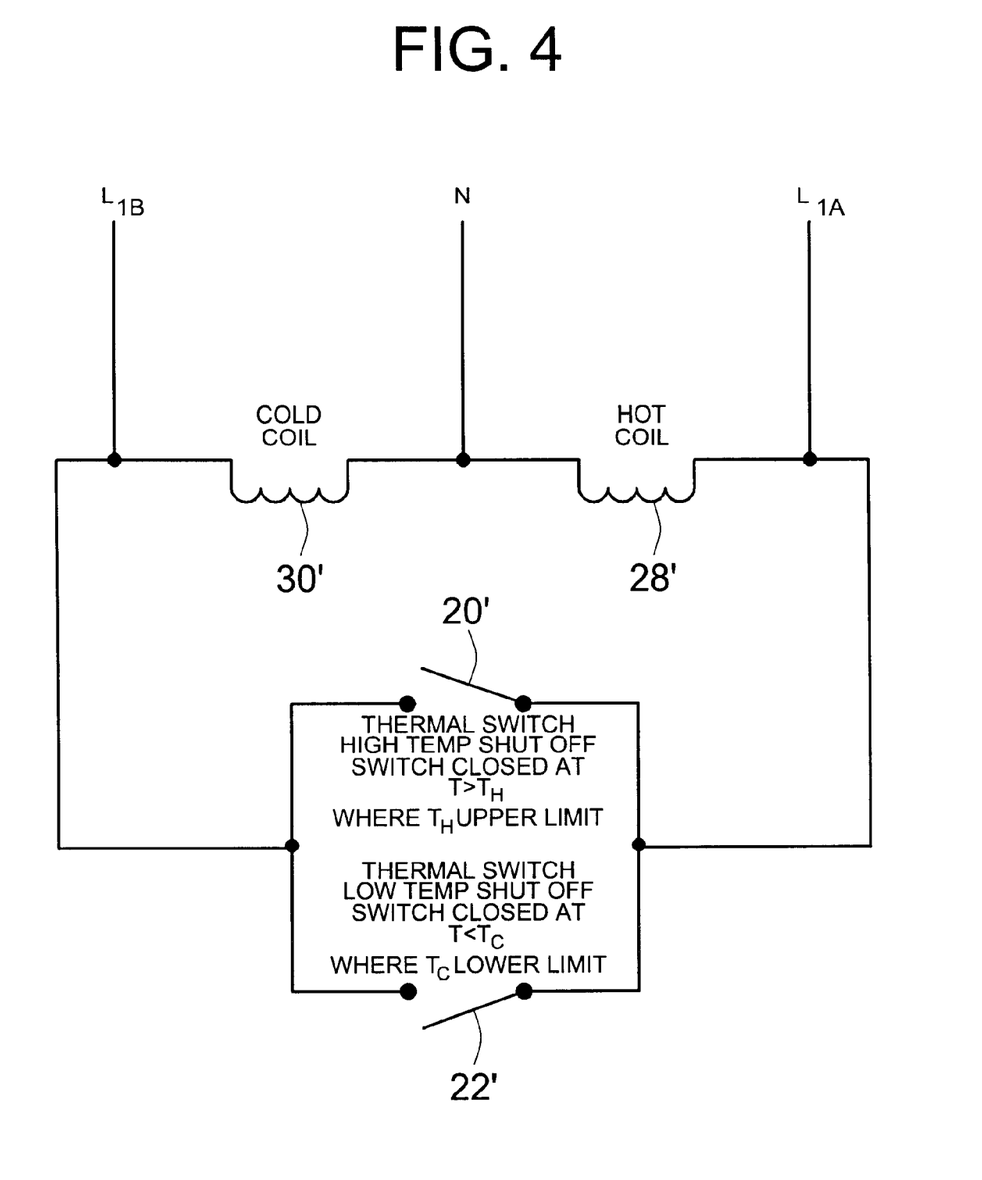
FIG. 4 is a simplified single line schematic illustration of the electrical control circuit of an embodiment of the present invention.

A significant advantage is provided in one embodiment to the present invention whereby the conventional water temperature mixing valve having the adaptor of the present invention attached thereto may automatically control the water temperature flowing through the valve without involvement or modification of any control circuitry that may exist in the machine. Specifically, the single line wiring diagram of FIG. 4 illustrates the control circuit of the present invention that allows for the automatic temperature control of this embodiment. That is, an automatic temperature control water mixing valve may be constructed in accordance with this embodiment of the present invention to maintain the water temperature in the washing tub below and/or above the temperature set points of the thermal acting switches 20, 22.

With specific reference to the schematic of FIG. 4, electrical coil 28' for the hot water valve control solenoid 28 (see FIG. 1) is wired in series between a utility line input $L_{1a}$ and the neutral N. Similarly, the electrical control coil 30' of the cold water electrically controlled solenoid valve 30 is also wired in series between a utility line input $L_{1b}$ and the neutral N. As will be recognized by one skilled in the art, any form of conventional control for switching the utility line input to $L_{1a}$ or $L_{1b}$ may be utilized for the primary water temperature valve control. That is, in a conventional washing machine a user temperature selection switch is used to energize the appropriate water temperature control valve. As an example, if a user were to desire a hot water wash, the temperature control switch (not shown) would connect the utility line input to the washing machine to contact $L_{1a}$. Likewise, a user selection of a cold water wash cycle would result in the user temperature selection switch energizing the contact $L_{1b}$. Other water temperature selections could additionally result in timed or programmed energization of either or both of these two inputs to control the electrical solenoids.

However, regardless of the primary control mechanism utilized in the washing machine, the control circuit of the present invention will ensure automatic temperature regulation without any modification to this primary control. Specifically, the electrical contact 20' of the high temperature thermal switch 20 (see FIG. 1) is connected to the utility line input $L_{1a}$ that is used to energize the hot water control coil 28'. The other side of this thermal switch 20' is connected to the primary or line input side of the control coil 30' for the cold water electrical control valve. This series connection of the power input for the hot water control valve 28 to the cold water control valve 30 ensures that the sensed temperature of the water flowing through the mixing valve of the present invention will not exceed the high temperature set point of the high temperature thermal switch 20 in the aggregate.

Once the sensed water temperature does exceed the temperature set point of the thermal switch 20, electrical contact 20' will close. This will connect the utility line input $L_{1a}$ to the line side of the cold water control coil 30', energizing this coil. As a result, the cold water electrical control valve will open, allowing a flow of cold water to commence therethrough. This cold water input will mix with the hot water input flowing in the mixing valve, resulting in an aggregate water temperature which is below the thermal set point of the switch 20. Once the thermal switch 20 senses that the water temperature flowing through the adaptor 10 has dropped below its reset temperature, the electrical contact 20' will open. This will de-energize the control coil 30' of the cold water solenoid valve, halting the flow of cold water into the mixing valve 12. As the temperature of the water flowing through the adaptor 10 will now be governed solely by the temperature of the hot water input, the thermal switch 20' will again close once its sensed temperature exceeds its thermal threshold, again energizing the control coil 30' of the cold water electrical control valve. As discussed above, the actuation and resetting time may be governed by the material properties or the thickness of the walls separating the thermal sense switches from the actual water flow within the adaptor 10. Further, as will be understood by those skilled in the art, the set and reset temperatures of the thermal switch may be identical, or may include a thermal hysteresis depending upon the particular selection and design of the thermal sense switches 20, 22.

In a like manner to the hot water example just discussed, an embodiment of the present invention may also include a low temperature thermal sense switch 22, which includes an electrical contact 22'. In accordance with this embodiment of the present invention, the low temperature thermal switch electrical contacts 22' are wired in series between the utility line input $L_{1b}$ and the line side of the hot water control coil of the electrically controlled solenoid valve 28. Utilizing such an arrangement, the aggregate water temperature in the washing tub will be above the thermal set point of the cold water thermal sense switch 22.

As an example, if a cold water wash were selected, the utility line input $L_{1b}$ would be used to energize the control coil 30' for the cold water electrically controlled valve. As such, this valve would be opened, and cold water would be allowed to flow through the mixing valve 12 and the adaptor 10 and into the washing tub. However, as the sensed temperature of the cold water drops below the set point of the low temperature thermal switch 22, the electrical contacts 22' would close, coupling the line input $L_{1b}$ to the line side of the control coil 28' of the hot water electrically controlled solenoid valve 28. As a result, the hot water valve 28 would be opened to allow the flow of hot water to mix with the cold water. The mixture of the hot and cold water would raise the temperature of the water flowing through the adaptor 10 and into the washing tub. However, as the sensed temperature of this water rises above the thermal set point of the low temperature thermal switch 22, its electrical contact 22' would open. This would result in the de-energization of the control coil 28' of the hot water electrically controlled solenoid valve 28, thus stopping the flow of hot water into the mixing valve 12. As a result, the temperature of the water flowing into the wash tub would then be governed solely by the cold water input. This cycle would repeat until the end of the fill cycle.

As with the high temperature thermal sensing, the speed at which the thermal switch 22 is able to detect the change in water temperature is governed by the material properties and/or the thickness of the wall separating the switch from the water flow itself. Depending on the application or desired features, the automatic temperature regulating mixing valve of the present invention may be made with either or both of the temperature sensing switches 20, 22.

In a preferred embodiment, the high temperature thermal switch 20 is set to close at a temperature of approximately 120° F. In this preferred embodiment the low temperature thermal switch 22 is set to close its contact 22' at a temperature set point of approximately 70° F. However, one skilled in the art will recognize that either or both of the upper and lower temperature limit set points may be varied to meet customer requirements or application needs.

A further method of adjusting the thermal sensitivity of the automatic temperature regulating valve is to adjust the differentials of either or both of the temperature sensing switches. The switch differential is the number of degrees between switch opening and closing temperatures.

Figure 5:
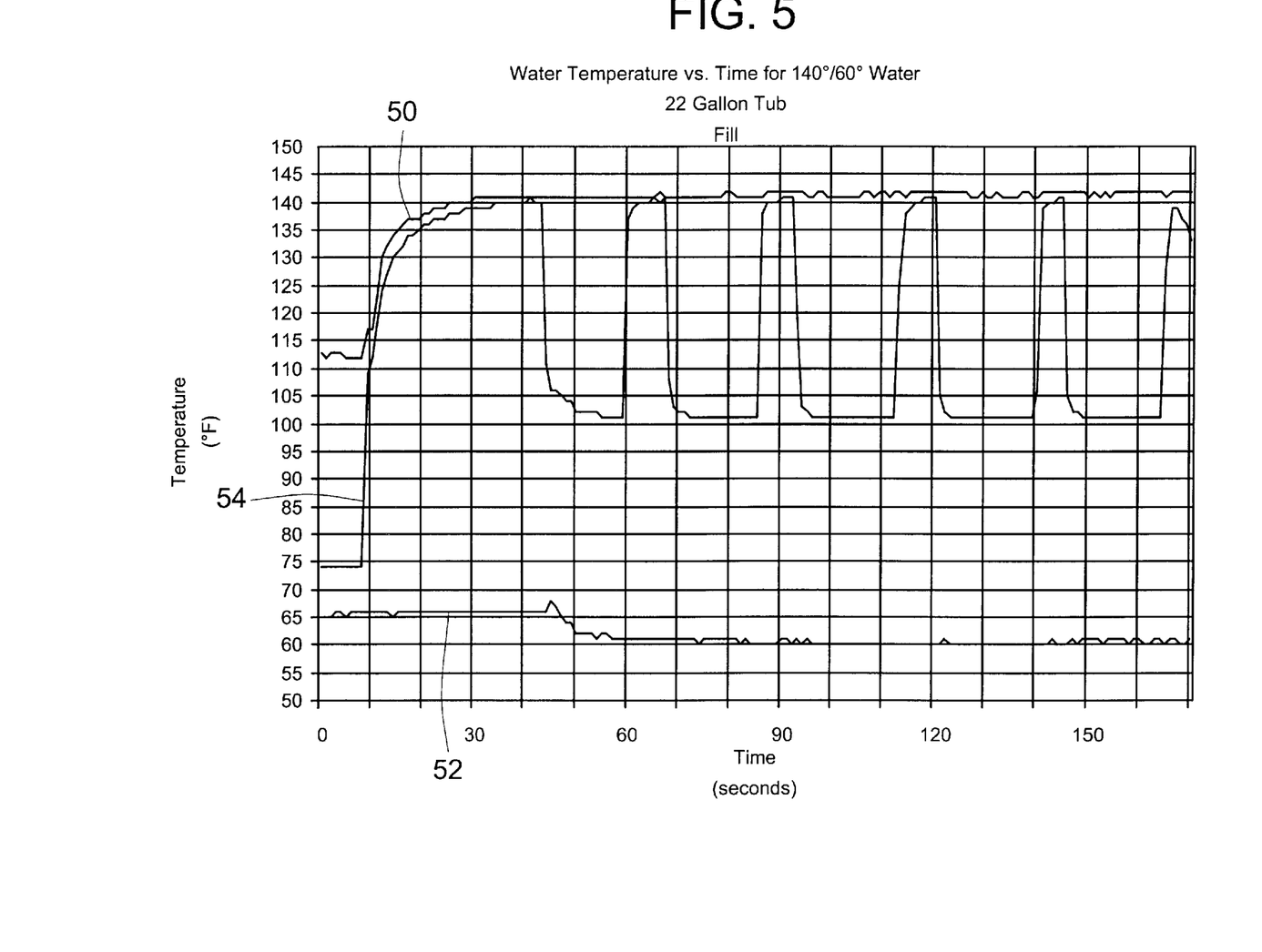
FIG. 5 is a graphical illustration of an exemplary water temperature fill cycle utilizing an embodiment of the present invention.
Figure 6:
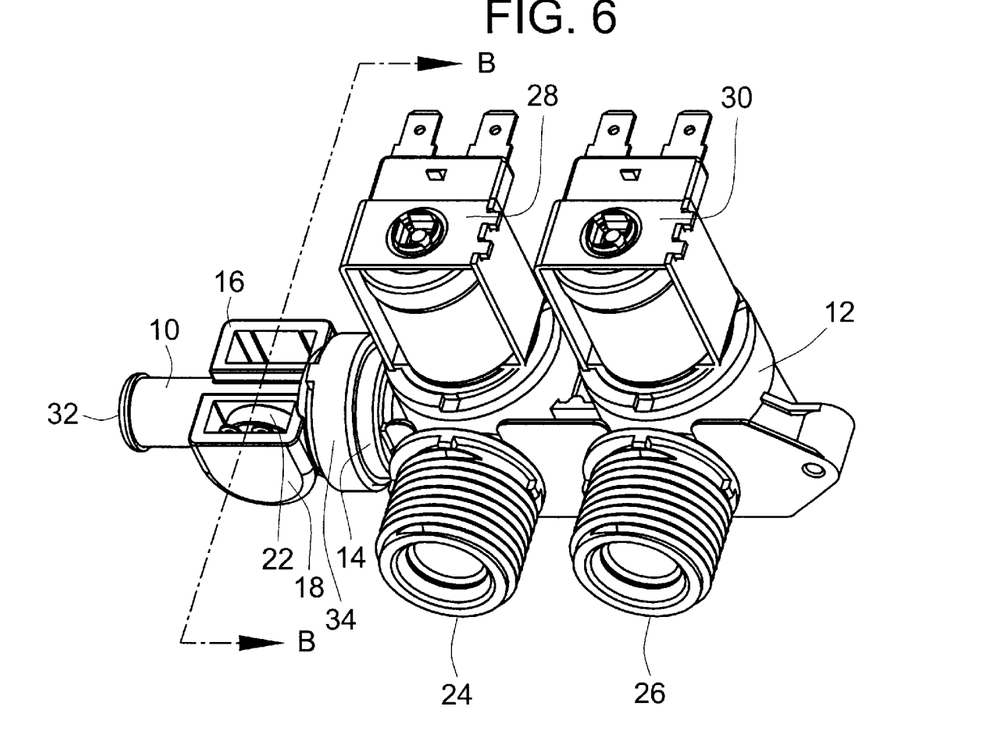
FIG. 6 is an isometric illustration of an alternate embodiment of the temperature regulating mixing valve constructed in accordance with the teachings of the present invention.
Figure 7:
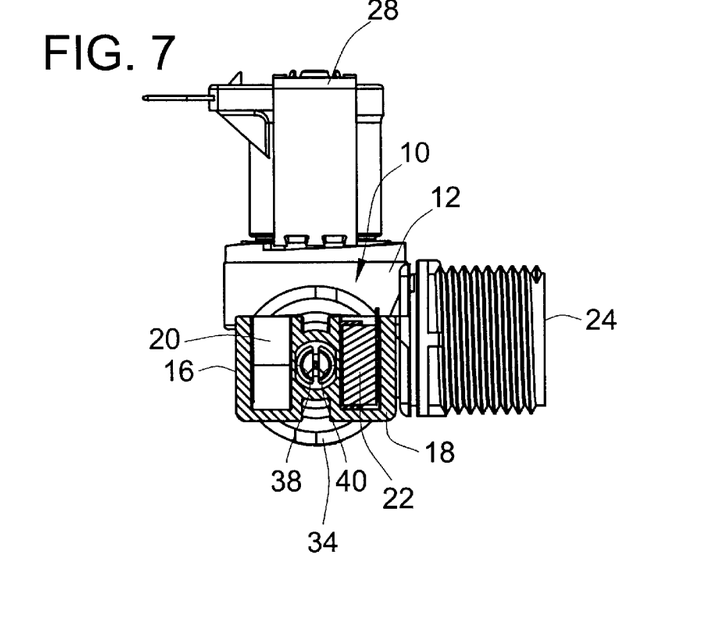
FIG. 7 is an end view cross-sectional illustration taken along Section BB of the embodiment of the present invention illustrated in FIG. 6.

A graphical illustration of an exemplary fill cycle of a washing machine utilizing the automatic temperature regulating mixing valve of the present invention is illustrated in the graph of FIG. 5. In this graphical illustration, reference numeral 50 is used to designate the temperature of the water flowing into the hot water inlet 24 of the mixing valve 12, reference numeral 52 is used to designate the temperature of the water flowing into the cold water inlet 26 of the mixing valve 12, and reference numeral 54 is used to designate the actual water temperature of the water flowing out of outlet 32 of adaptor 10.

As may be seen from this illustration, during the initial approximately 30 seconds of the fill cycle the water temperature 50 of the hot water flowing into the valve 12 is below its steady state temperature setting of approximately 140°. This is a result of cooling of the water in the plumbing between the hot water heater and the installation location of the washing machine. As such, and depending on insulation around such plumbing, this period of time may be increased or decreased, as may the actual starting temperature of the hot water flow. As a result, the temperature of the water 54 flowing out of the outlet 32 of the adaptor 10 is substantially below its steady state hot water temperature. However, the temperature of the water flowing out of the adaptor 10 soon exceeds the desired aggregate water temperature for the hot water wash cycle. Indeed, the outlet water temperature will soon match the inlet hot water temperature, which in this example is set to 140°. This condition is allowed to continue for a period of time that may be adjusted by varying the material thermal properties of the adaptor 10 or the wall thickness 38, 40 (see FIG. 3) between the actual water flow and the thermal sense switches as discussed above.

Once the thermal sense switch 20 senses that the water temperature has exceeded its thermal set point, it will close its electrical contact 20', energizing the cold water control coil 30' (see FIG. 4). At this point, represented by a time index of approximately 42 seconds in FIG. 5, cold water will begin flowing into the mixing valve 12. As may be seen from an examination of FIG. 5, the actual outlet water temperature 54 drops immediately as the hot and cold water are now mixed within the mixing valve. This mixing almost immediately drops the outlet temperature 54 below the thermal reset point of the thermal switch 20. Even through the temperature of the water flowing through the outlet 32 of the adaptor 10 drops almost immediately below the thermal reset point of the thermal switch 20, the thermal properties of the adaptor 10 discussed above will provide a period represented by the thermal delay of the sensing of this temperature drop. However, at approximately 60 seconds the thermal switch 20 resets its electrical switch 20', de-energizing the cold water control solenoid 30. As such, the outlet water temperature 54 is governed once again solely by the temperature 50 of the hot water flowing therethrough. Once the thermal switch 20 senses the high temperature water, it will again close its electrical contact 20' to energize the control coil 30' of the cold water electrically controlled water valve 30.

This cycling will continue as illustrated in FIG. 5 until the fill cycle is complete. As a result of this operation, the aggregate temperature of the water in the washtub does not exceed its desired temperature. Further, while not illustrated in the interest of brevity, one skilled in the art will recognize from the foregoing description that a similar operation will occur for a cold water wash to prevent the aggregate temperature of the water in the wash tub from dropping below a desired temperature.

Figure 8:
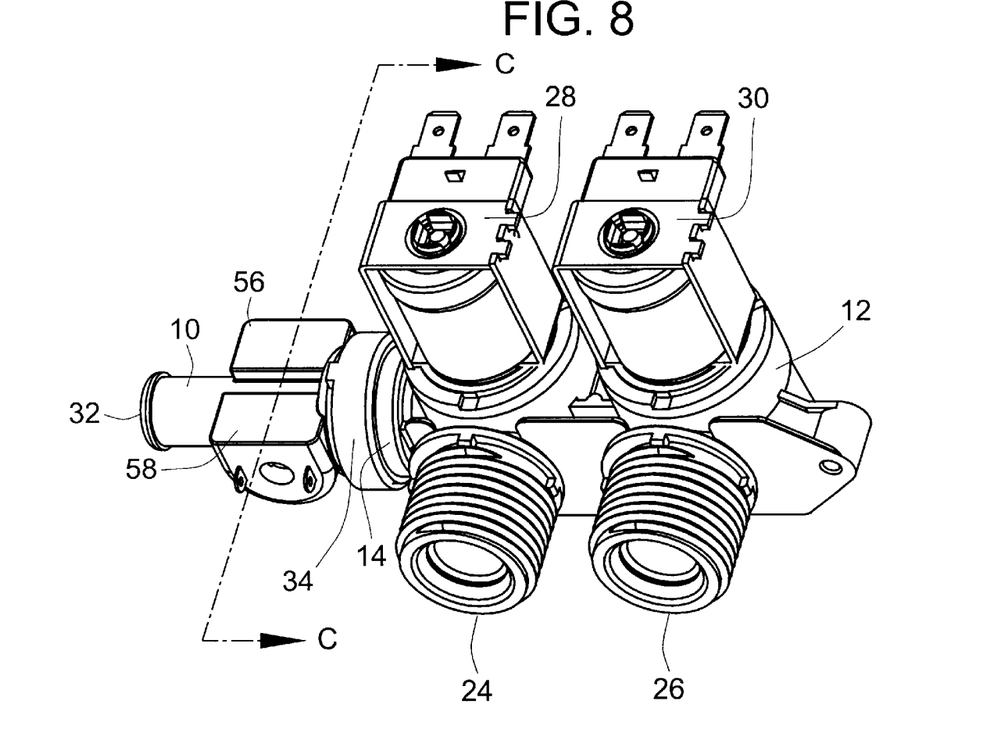
FIG. 8 is an isometric illustration of an alternate embodiment of the temperature regulating mixing valve constructed in accordance with the teachings of the present invention.
Figure 9:
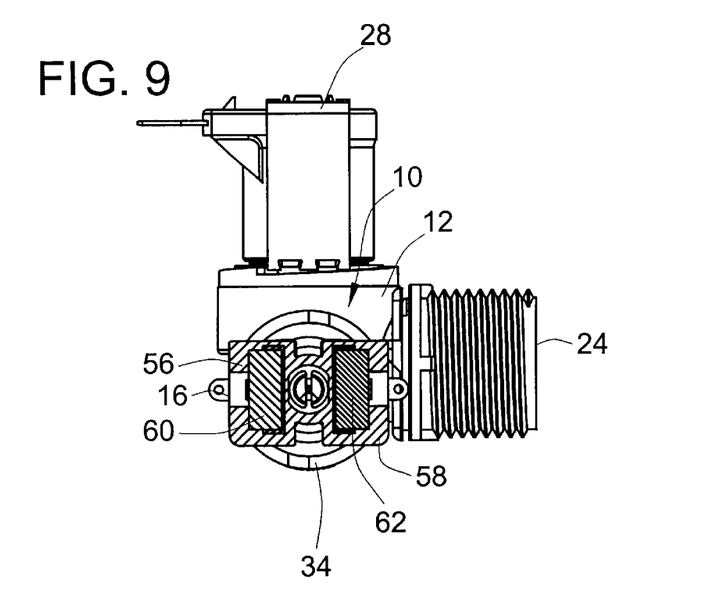
FIG. 9 is an end view cross-sectional illustration taken along Section CC of the embodiment of the present invention illustrated in FIG. 8.

FIG. 8 illustrates an alternate embodiment of the present invention utilizing insert molded thermal switches 56, 58. As may be seen from the cross-sectional illustration of FIG. 9, the thermal sensing elements themselves 60, 62 are insert molded 56, 58 into the adaptor 10 of the present invention. While this embodiment does not allow for interchangeability of the thermal sensing elements 60, 62, it simplifies the manufacturing process and protects the thermal switches 60, 62 from damage.

Figure 10:
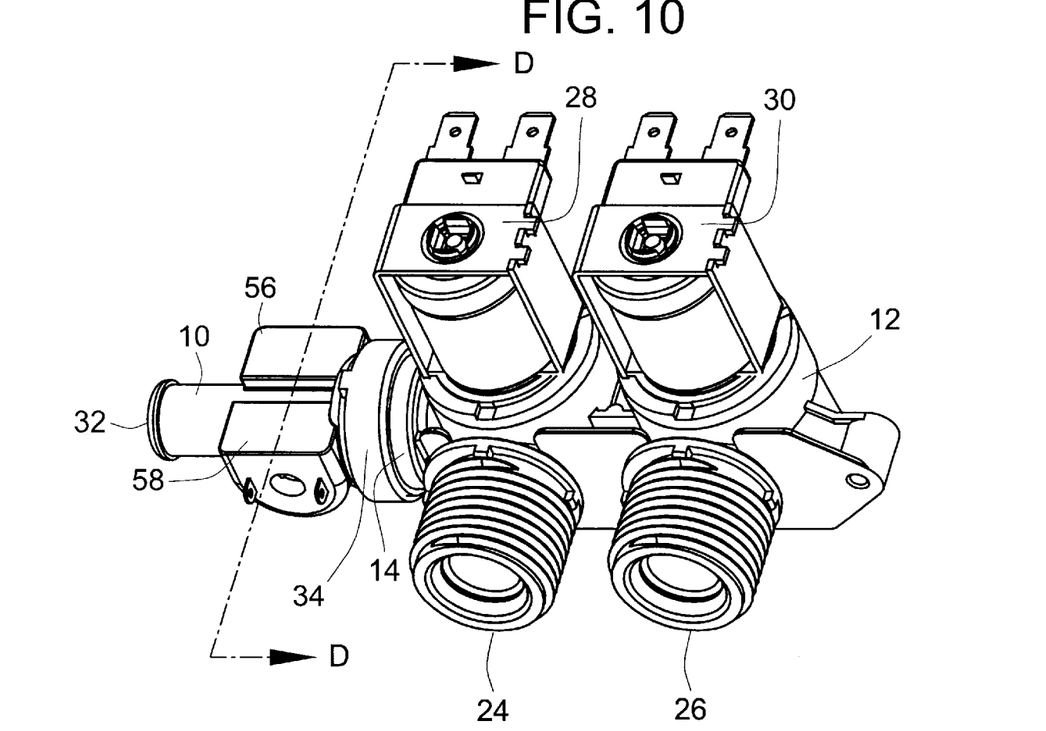
FIG. 10 is an isometric illustration of an alternate embodiment of the temperature regulating mixing valve constructed in accordance with the teachings of the present invention.
Figure 11:
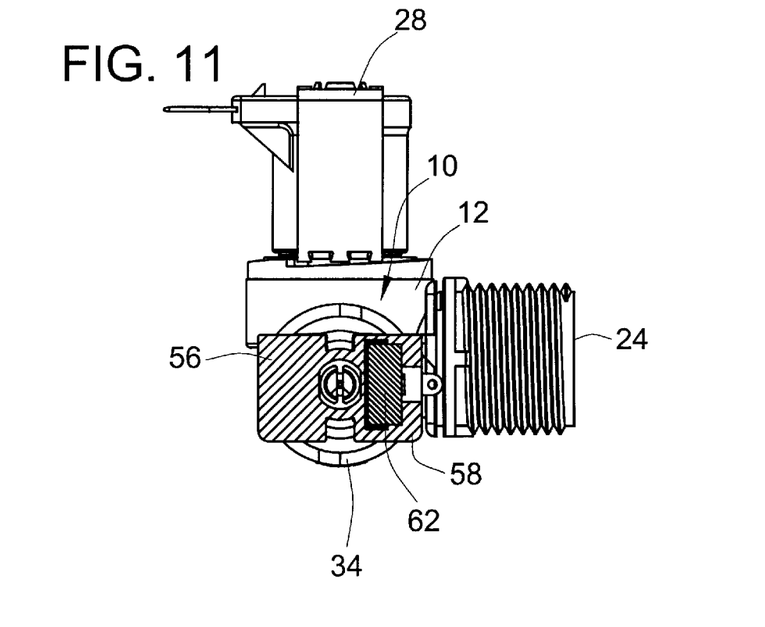
FIG. 11 is an end view cross-sectional illustration taken along Section DD of the embodiment of the present invention illustrated in FIG. 10.

An alternate embodiment of the present invention is illustrated in FIG. 10. While this illustration appears similar to the embodiment illustrated in FIG. 8, the cross sectional view of FIG. 11 highlights the distinction between these two embodiments. Specifically, in the embodiment illustrated in FIGS. 10 and 11 only a single insert molded thermal switch 62 is utilized. As will be apparent from the foregoing description, this thermal switch 62 may be used to provide either an upper or a lower temperature set point as desired.

Figure 12:
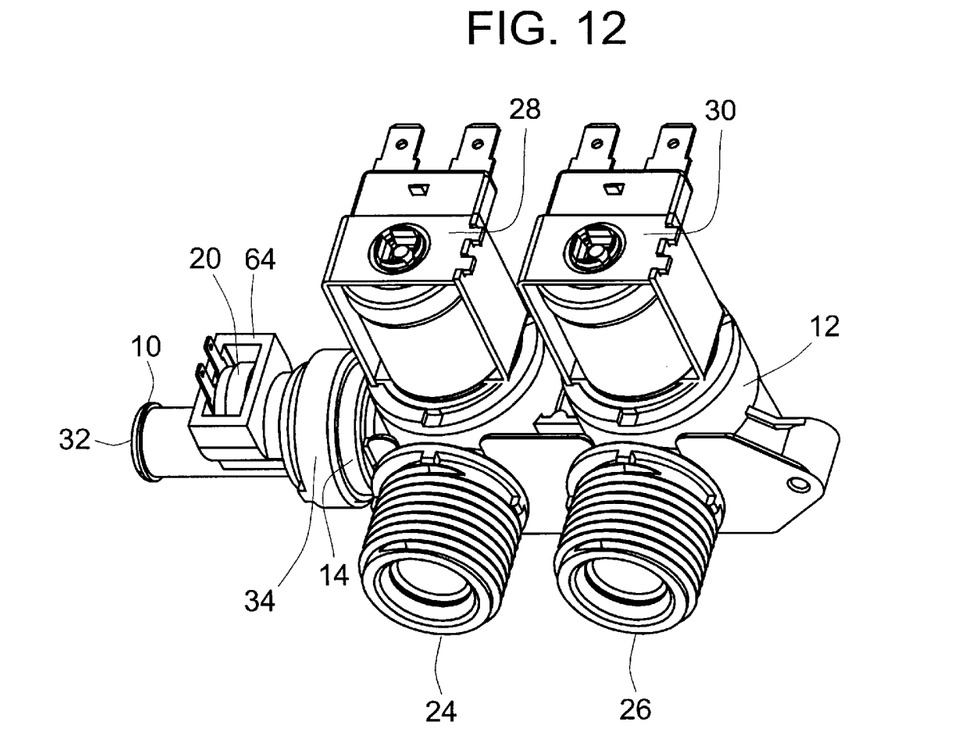
FIG. 12 is an isometric illustration of yet a further embodiment of the temperature regulating mixing valve constructed in accordance with the teachings of the present invention having a thermal sensing switch position perpendicular to the outlet water flow.
Figure 13:
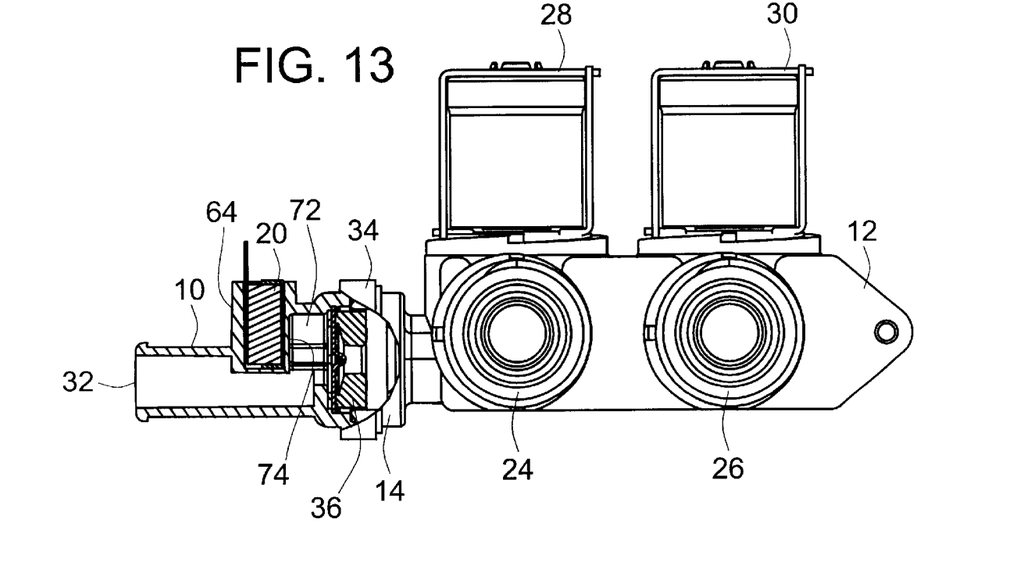
FIG. 13 is a partial cutaway illustration of the embodiment of the present invention illustrated in FIG. 12.

A further alternate embodiment is illustrated in FIG. 12. In this embodiment only a single thermal switch 20 is utilized. This switch 20 is provided in a molded pocket 64 that is oriented perpendicular to the water flow through the adaptor 10. As shown in FIG. 13 in partial cross-section, the flow of water through the adaptor 10 fills a temperature sensing chamber 72 within the adaptor 10. The sensing element of the thermal switch 20 senses the temperature of the water in this chamber 72. Indeed, the water flowing into this sensing chamber 72 impinges directly on the wall 74 adjacent the thermal switch 20, which provides increased thermal transfer along that surface.

Figure 14:
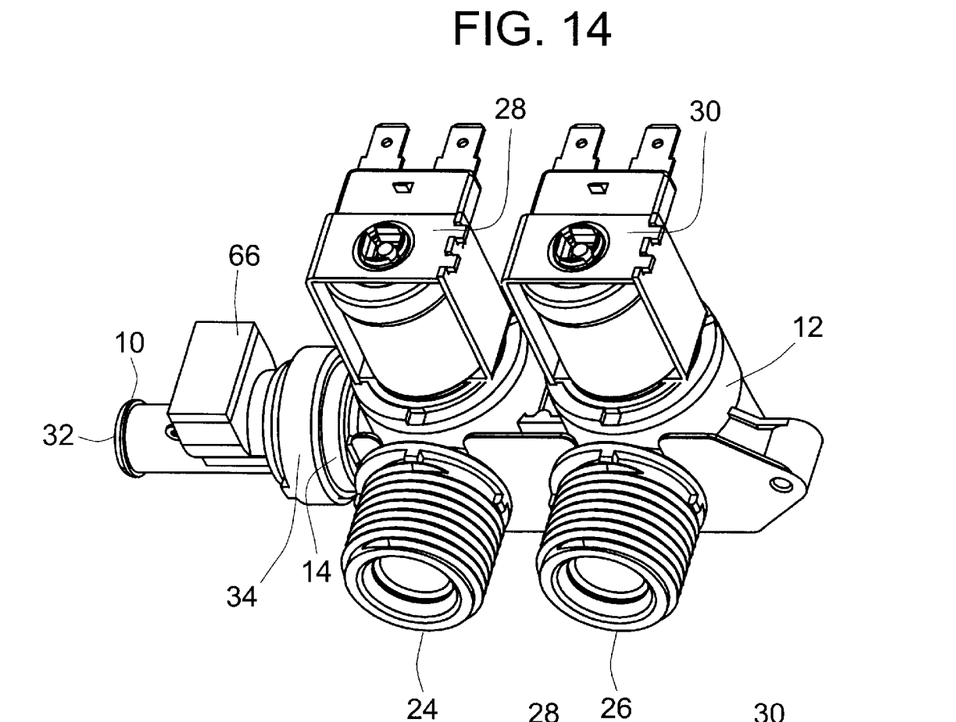
FIG. 14 is an isometric illustration of yet a further embodiment of the temperature regulating mixing valve constructed in accordance with the teachings of the present invention having a thermal sensing switch position perpendicular to the outlet water flow.
Figure 15:
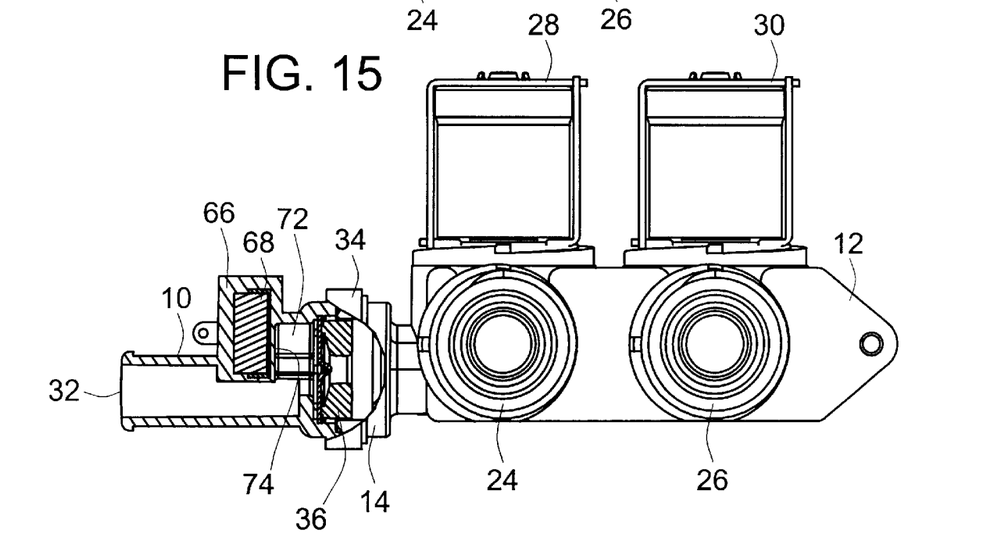
FIG. 15 is a partial cutaway illustration of the embodiment of the present invention illustrated in FIG. 14.

Yet a further embodiment illustrated in FIG. 14 and in partial cutaway in FIG. 15 also provide only a single thermal switch 68 insert molded 66 into the adapter 10 in an orientation perpendicular to the water flow. As with the prior embodiment of FIG. 12, this embodiment also includes a temperature sensing chamber 72. As water flows into this chamber 72 it impinges on wall 74 as discussed above. As such, this configuration also provides increased thermal transfer across the surface 74 to provide a more rapid sensing of the temperature change of the water flowing through the adaptor 10.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible, variations thereof is encompassed by the invention unless otherwise indicated herein or otherwise clearly contradicted by context.

What is claimed is:

1. An adapter for use with a mixing valve having hot and cold fluid inlets, a mixing body, and an outlet, the mixing valve further having electrically controlled valves governing the flow of fluid into each of the hot and cold fluid inlets, the adapter comprising:
   a flow body having an adapter inlet adapted to be attached to the outlet of the mixing valve, an adapter outlet, and a flow channel therebetween, the flow body forming at least one sensor pocket having an interior temperature sensing surface positioned in thermal communication with the flow channel; and
   a thermal sensing switch positioned in said at least one sensor pocket to sense a temperature of the interior temperature sensing surface.

2. The adapter of claim 1, wherein the at least one sensor pocket is positioned along a length of the flow channel.

3. The adapter of claim 1, wherein the flow body further defining a sensing chamber adjacent the adapter inlet, and wherein the at least one sensor pocket is positioned perpendicular to a length of the flow channel with the interior temperature sensing surface being positioned in thermal communication with the sensing chamber.

4. The adapter of claim 1, wherein the adapter inlet is further adapted to receive a flow control element, and wherein the adapter further comprises a flow control element positioned in the adapter inlet.

5. The adapter of claim 1, wherein the at least one thermal sensing switch is a normally open switch that closes upon sensing a temperature greater than a predetermined threshold.

6. The adapter of claim 5, wherein each electrically controlled valve of the mixing valve includes a solenoid control coil having a line and a neutral terminal, and wherein each side of the normally open switch is electrically coupled to the line terminal of each of the solenoid control coils.

7. The adapter of claim 1, wherein the at least one thermal sensing switch is a normally open switch that closes upon sensing a temperature less than a predetermined threshold.

8. The adapter of claim 7, wherein each electrically controlled valve of the mixing valve includes a solenoid control coil having a line and a neutral terminal, and wherein each side of the normally open switch is electrically coupled to the line terminal of each of the solenoid control coils.

9. The adapter of claim 1, wherein the at least one thermal sensing switch is removably positioned in the sensor pocket.

10. The adapter of claim 1, wherein the at least one thermal sensing switch is insert molded into the sensor pocket.

11. The adapter of claim 1, wherein the flow body further comprises:
   a second sensor pocket having an interior temperature sensing surface positioned in thermal communication with the flow channel; and a second thermal sensing switch positioned in said second sensor pocket to sense a temperature of the interior temperature sensing surface of the second sensor pocket.

12. The adapter of claim 11, wherein each electrically controlled valve of the mixing valve includes a solenoid control coil having a line and a neutral terminal, and wherein each thermal sensing switch is electrically coupled between the line terminals of each of the solenoid control coils.

13. The adapter of claim 1, wherein a thickness of the flow body between the interior temperature sensing surface and the flow channel is selected to provide a predetermined thermal transfer rate thereacross.

14. The adapter of claim 1, wherein a material property of the flow body between the interior temperature sensing surface and the flow channel is selected to provide a predetermined thermal transfer rate thereacross.

15. The adapter of claim 1, wherein the flow body is molded plastic.

16. An automatic temperature regulating mixing valve, comprising:

a mixing valve body having hot and cold fluid inlets, and an outlet, the mixing valve body further having electrically controlled valves governing the flow of fluid into each of the hot and cold fluid inlets, each of the electrically controlled valves having a line input; and an adapter having a flow body including an adapter inlet attached to the outlet of the mixing valve, an adapter outlet, and a flow channel therebetween, the flow body forming at least one sensor pocket having an, interior temperature sensing surface positioned in thermal communication with the flow channel; and a thermal sensing switch positioned in said at least one sensor pocket to sense a temperature of the interior temperature sensing surface, the thermal sensing switch being electrically coupled between the line inputs of each of the electrically controlled valves.

17. The automatic temperature regulating mixing valve of claim 16, wherein the at least one sensor pocket is positioned along a length of the flow channel.

18. The automatic temperature regulating mixing valve of claim 16, wherein the flow body further defining a sensing chamber adjacent the adapter inlet, and wherein the at least one sensor pocket is positioned perpendicular to a length of the flow channel with the interior temperature sensing surface being positioned in thermal communication with the sensing chamber.

19. The automatic temperature regulating mixing valve of claim 16, wherein the adapter inlet is further adapted to receive a flow control element, and wherein the adapter further comprises a flow control element positioned in the adapter inlet.

20. The automatic temperature regulating mixing valve of claim 16, wherein the at least one thermal sensing switch is a normally open switch that closes upon sensing a temperature greater than a predetermined threshold.

21. The automatic temperature regulating mixing valve of claim 16, wherein the at least one thermal sensing switch is a normally open switch that closes upon sensing a temperature less than a predetermined threshold.

22. The automatic temperature regulating mixing valve of claim 16, wherein the at least one thermal sensing switch is removably positioned in the sensor pocket.

23. The automatic temperature regulating mixing valve of claim 16, wherein the at least one thermal sensing switch is insert molded into the sensor pocket.

24. The automatic temperature regulating mixing valve of claim 16, wherein the flow body further comprises:

a second sensor pocket having an interior temperature sensing surface positioned in thermal communication with the flow channel; and a second thermal sensing switch positioned in said second sensor pocket to sense a temperature of the interior temperature sensing surface of the second sensor pocket.

25. The automatic temperature regulating mixing valve of claim 24, wherein each thermal sensing switch is electrically coupled between the line terminals of each of the electrically controlled valves.

26. The automatic temperature regulating mixing valve of claim 16, wherein a thickness of the flow body between the interior temperature sensing surface and the flow channel is selected to provide a predetermined thermal transfer rate thereacross.

27. The automatic temperature regulating mixing valve of claim 16, wherein a material property of the flow body between the interior temperature sensing surface and the flow channel is selected to provide a predetermined thermal transfer rate thereacross.

28. The automatic temperature regulating mixing valve of claim 16, wherein the flow body is molded plastic.

29. A method of providing automatic temperature regulation for a fluid mixing valve having hot and cold fluid inlets, a mixing body, and an outlet, the mixing valve further having electrically controlled valves governing the flow of fluid into each of the hot and cold fluid inlets, comprising the steps of:

providing a flow body having an adapter inlet, an adapter outlet, and a flow channel therebetween, the flow body forming at least one sensor pocket having an interior temperature sensing surface positioned in thermal communication with the flow channel;

placing a thermal sensing switch in the at least one sensor pocket to sense a temperature of the interior temperature sensing surface;

attaching the adapter inlet to the outlet of the mixing valve;

electrically coupling the thermal sensing switch between a line input of each of the electrically controlled valves.

30. The method of claim 29, wherein the step of attaching the adapter inlet to the outlet of the mixing valve comprises the step of spin welding the adapter inlet to the outlet of the mixing valve.

31. The method of claim 29, wherein the step of placing a thermal sensing switch in the at least one sensor pocket comprises the step of removably placing a thermal sensing switch in the at least one sensor pocket.

32. The method of claim 29, wherein the step of placing a thermal sensing switch in the at least one sensor pocket comprises the step of insert molding a thermal sensing switch in the at least one sensor pocket.

33. The method of claim 29, further comprising the step of controlling a thermal response rate of the thermal sensing switch.

34. The method of claim 33, wherein the step of controlling a thermal response rate of the thermal sensing switch comprises the step of controlling a thickness of the flow body between the interior temperature sensing surface and the flow channel.

35. The method of claim 33, wherein the step of controlling a thermal response rate of the thermal sensing switch comprises the step of selecting a material property of the flow body between the interior temperature sensing surface and the flow channel.

36. The method of claim 33, wherein the step of controlling a thermal response rate of the thermal sensing switch comprises the step of selecting a switch differential.

37. The method of claim 29, wherein the step of providing a flow body comprises the step of providing a flow body forming two sensor pockets, and wherein the step of placing a thermal sensing switch in the sensor pocket comprises the step of placing a thermal sensing switch in each of the two sensor pockets.

38. The method of claim 37, wherein the step of electrically coupling the thermal sensing switch between a line input of each of the electrically controlled valves comprises the steps of electrically coupling each the thermal sensing switches between the line input of each of the electrically controlled valves.

* * * * *